United States Patent [19]
Ito

[11] Patent Number: 5,933,250
[45] Date of Patent: Aug. 3, 1999

[54] OPTICAL SCANNING DEVICE

[75] Inventor: Koji Ito, Nagoya, Japan

[73] Assignee: Brother Kogyo Kabushiki Kaisha, Nagoya, Japan

[21] Appl. No.: 08/824,342

[22] Filed: Mar. 26, 1997

[30] Foreign Application Priority Data

Mar. 27, 1996 [JP] Japan .................................. 8-072211

[51] Int. Cl.$^6$ .................................................. H04N 1/04
[52] U.S. Cl. .......................................... 358/481; 358/494
[58] Field of Search ................................... 358/481, 494

[56] References Cited

U.S. PATENT DOCUMENTS

| | | | |
|---|---|---|---|
| 4,831,247 | 5/1989 | Ishizaka | 358/481 |
| 4,962,431 | 10/1990 | Imakawa et al. | 358/481 |
| 5,543,955 | 8/1996 | Yamazaki et al. | |
| 5,596,424 | 1/1997 | Iizuka et al. | 358/481 |

FOREIGN PATENT DOCUMENTS

A-7-199097  8/1995  Japan .

*Primary Examiner*—Phuoc Tran
*Attorney, Agent, or Firm*—Oliff & Berridge, PLC

[57] ABSTRACT

Light beams emitted by a plurality of light sources 1 and 2 are synthesized so as to travel along a common optical path P. The synthesized light beams are deflected by a polygonal rotating mirror 4 and converged. The converged light beams fall on a beam splitting mirror 6. One of the light beams is projected on the image forming surface of a photosensitive member 7 for image writing. Another light beam scans the image surface of a document 8, and light scattered and reflected from the image surface of the document is detected by five photoelectric conversion devices 31–35. Two of the outputs from the photoelectric conversion device 31–35 are inputted to an adding circuit 11 where the inputted outputs are added together. The output from the adding circuit 11 is inputted to the CPU 14 as image information of the signal.

18 Claims, 5 Drawing Sheets

OPTICAL SCANNING DEVICE

BACKGROUND OF THE INVENTION

1. Field of the Invention

The present invention relates to an optical scanning device which is capable of reading image information from a document and which is used in a laser beam printer for writing images by electrophotographic processes.

2. Description of the Related Art

There has been known an image reading optical device capable of reading an entire image from a document. The image reading optical device first irradiates the document surface with fluorescent light, for example. Light reflected from the document surface is guided toward a line sensor by a reducing projection lens. The line sensor is comprised of a charge-coupled device (CCD) extending in a main scanning direction. Detection signals outputted from the line sensor represent a single line's worth of image of the document. The document surface is scanned in an auxiliary scanning direction orthogonal to the main scanning direction, thereby obtaining image information of the entire document.

There has also been known an image writing optical device. In the image writing optical device, a polygon mirror is rotatingly provided to scan a photosensitive layer on the surface of a photosensitive drum in a main scanning direction. The main scanning direction extends parallel with an axis of the photosensitive drum. The photosensitive drum rotates about its axis in an auxiliary scanning direction so that a latent image is formed on the photosensitive layer. The latent image is then developed into a toner image through a predetermined electrophotographic process. That is, toner is supplied from a developing unit and selectively attached onto the surface of the photosensitive drum. A transferring unit transfers the toner image onto a recording sheet. A fixing unit fixes the transferred toner image onto a recording sheet.

Japanese Laid-Open Patent Application No. HEI-7-199097 discloses another device which has both an image reading function and an image writing function. This device uses optical components common to perform both an image reading operation and an image writing operation.

SUMMARY OF THE INVENTION

It is conceivable to provide an improved optical scanning device which modulates a light beam with a fixed frequency before emitting the light beam onto the document. The light beam is reflected at and scattered by the document. The light beam is then converted into electric signals with a plurality of photoelectric conversion elements. The electric signals from all the photoelectric conversion elements are then added together into a single electric signal. The electric signal is then demodulated Into image information of the document. Influences from both the external light and external electric noises can be reduced.

With this conceivable configuration, when a noise voltage N is generated in each photoelectric conversion element, a total noise voltage, included in the finally-obtained electric signal, becomes as large as $M^{1/2} \cdot N$ where M is the total number of the photoelectric conversion elements. This will lead a serious problem when a great number M of photoelectric conversion elements are used.

It is therefore an objective of the present invention to overcome the above-described problem and to provide an improved optical scanning device which is capable of reducing noises included in the finally-obtained signals.

In order to attain the above and other objects, the present invention provides an optical scanning device comprising: a plurality of light sources which emit a plurality of light beams of different wavelengths; an optical path combining unit which guides the plurality of light beams emitted from the plurality of light sources through a single optical path, thereby combining the light beams along a single light beam; a light deflecting unit which deflects the single light beam produced by the optical path combing unit; a light converging unit which converges the single light beam deflected by the light deflecting unit; an optical path separating unit which receives the single light beam having passed through the light converging unit and which separates the single light beam into the plurality of light beams so that one of the light beams falls incident on an image forming surface of a photosensitive body and so that another one of the light beams falls incident on a surface of a document to be read; a horizontal synchronization signal detection unit which receives the single light beam deflected by the light deflection unit and outputs a horizontal synchronization signal; a light detection unit which detects light scattered by the surface of the document, the light detection unit including at least three photoelectric conversion elements; a photoelectric conversion element selection unit which serially selects at least two photoelectric conversion elements out of the at least three photoelectric conversion elements; and an adding unit which adds outputs from the selected photoelectric conversion elements, thereby producing image information of the document.

According to another aspect, the present invention provides an optical scanning device comprising: a plurality of light sources which emit a plurality of light beams of different wavelengths; an optical path combining unit which guides the plurality of light beams emitted from the plurality of light source along a single optical path, thereby combining the light beams into a single light beam; a light deflecting unit which deflects the single light beam produced by the optical path combing unit; a light converging unit which converges the single light beam deflected by the light deflecting unit; an optical path separating unit which receives the single light beam having passed through the light converging unit and separates the single light beam into the plurality of light beams so that one of the light beams falls incident on an image forming surface of a photosensitive body and so that another one of the light beams falls incident on a surface of a document to be read; a light detecting unit which detects light scattered by the surface of the document, the light detection unit including at least three photoelectric conversion elements; a photoelectric conversion element selection unit which serially selects at least two photoelectric conversion elements out of the at least three photoelectric conversion elements; and an adding unit which adds outputs from the selected photoelectric conversion elements, thereby producing image information of the document.

BRIEF DESCRIPTION OF THE DRAWINGS

The above and other objects, features and advantages of the invention will become more apparent from reading the following description of the preferred embodiment taken in connection with the accompanying drawings in which:

FIG. 3(b) showing a graph of a signal voltage outputted from the photoelectric conversion device 32; FIG. 3(c) showing a graph of a signal voltage outputted from the photoelectric conversion device 33; FIG. 3(d) showing a graph of a signal voltage outputted from the photoelectric conversion device 34; FIG. 3(e) showing a graph of a signal voltage outputted from the photoelectric conversion device 35; FIG. 3(f) showing a graph of a signal voltage supplied to the output terminal 51 of the photoelectric conversion device selection unit 10; FIG. 3(g) showing a graph of a signal voltage supplied to the output terminal 52 of the photoelectric conversion device selection unit 10; and FIG. 3(h) showing a graph of a signal voltage outputted from the adding circuit 11;

DETAILED DESCRIPTION OF THE PREFERRED EMBODIMENT

Figure 1:
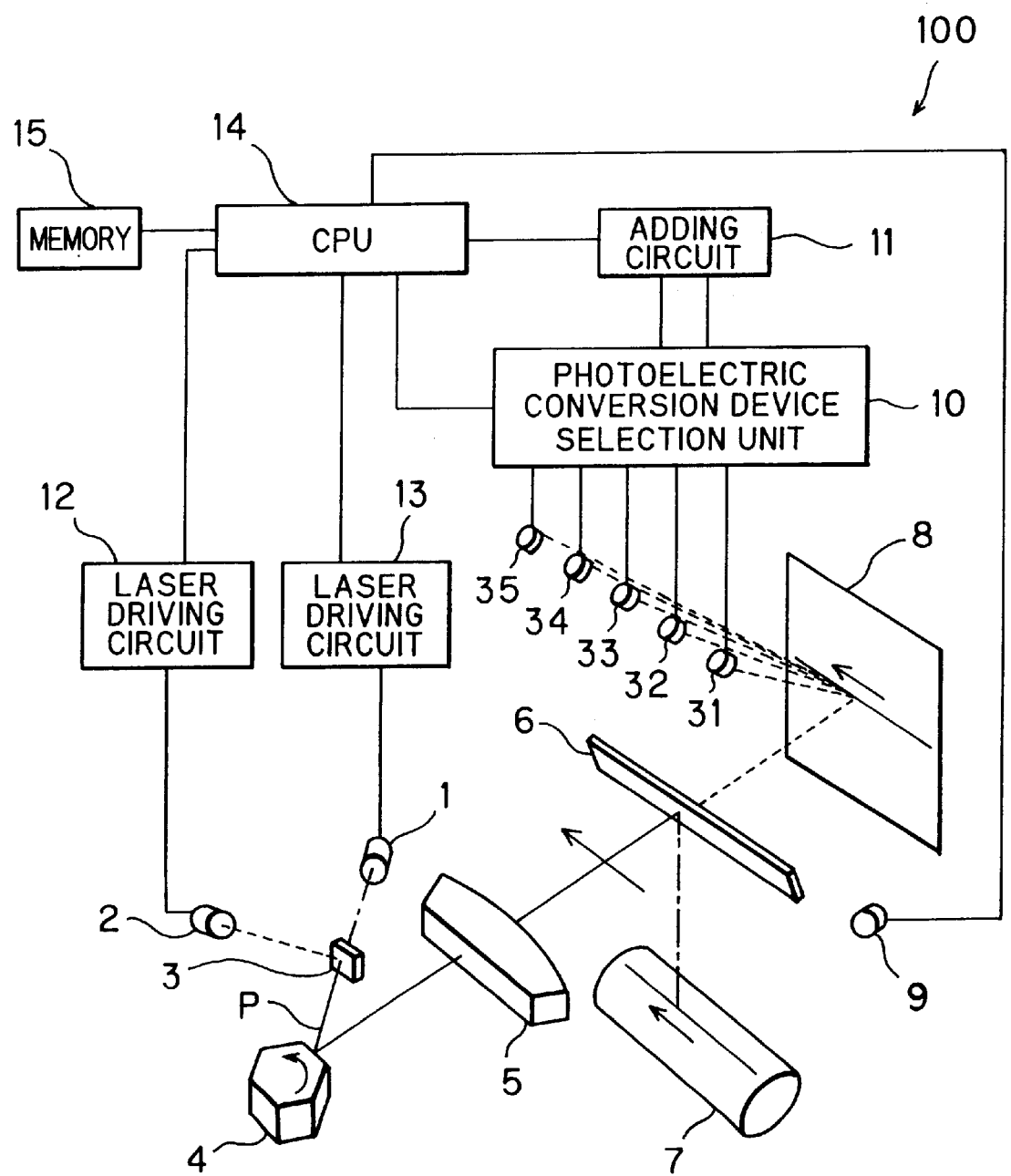
FIG. 1 is a schematic view of an optical scanning device according to an embodiment of the present invention.

An optical scanning device according to a preferred embodiment of the present invention will be described while referring to the accompanying drawings wherein like parts and components are designated by the same reference numerals to avoid duplicating description.

FIG. 1 is a schematic view of an optical scanning device 100 according to the present embodiment. The optical scanning device 100 can attain both an image writing function and an image reading function.

As shown in FIG. 1, in the device 100, a central processing unit (CPU) 14 is electrically connected to a memory 15, a first laser driving circuit 13, a second laser driving circuit 12, a photoelectric conversion device selection unit 10, an adding circuit 11, and a photosensor 9. The photoelectric conversion device selection unit 10 is electrically connected to the adding circuit 11. Five photoelectric conversion devices 31–35 are electrically connected to the photoelectric conversion device selection unit 10.

The first laser driving circuit 13 is for driving a first laser source 1, and a second laser driving circuit 12 is for driving a second laser source 2. The memory 15 is for storing first image information to be written on a photosensitive drum 7 and for storing second image information read out from an original document 8. The CPU 14 is for controlling the entire device 100. For example, the CPU 14 retrieves the first image information from the memory 15 and produces a control signal for controlling the laser driving circuit 13 to drive the laser source 1 in accordance with the first image information. The first laser source 1 emits a first light beam with its intensity being modulated in accordance with the first image information. The first laser source 1 emits the first light beam of a first wavelength λ1 of 780 nm, for example. The first laser source 1 is constructed from a semiconductor laser, for example. The CPU 14 also controls the second laser driving circuit 12 to emit a second light beam of a uniform intensity. The second laser source 2 emits the second light beam of a second wavelength λ2 of 670 nm, for example. The second laser source 2 is constructed from a semiconductor laser, for example.

A first dichroic mirror 3 is disposed to receive both the first light beam and the second light beam. The dichroic mirror 3 can selectively reflect or transmit incident light beams depending on their wavelengths. According to the present embodiment, the dichroic mirror 3 synthesizes the first and second light beams into a single light beam. In more concrete terms, the dichroic mirror 3 transmits the first light beam so as to guide the first light beam along a predetermined optical path P. The dichroic mirror 3 reflects the second light beam so as to guide the second light beam also along the optical path P. As a result, the first and second light beams are synthesized into a single light beam that travels along the common optical path P.

A polygonal rotating mirror 4 is disposed on the optical path P of the synthesized light beam. The polygonal rotating mirror 4 rotates at a fixed speed to reflect and deflect the received synthesized light beam. An f θ lens 5 is disposed to receive the deflected light beam and to converge the light beam onto the document 8.

As the polygon mirror 4 rotates, the synthesized-and-converged light beam sweeps in a main scanning direction indicated by an arrow in the figure. A second dichroic mirror 6 is disposed on the sweeping path of the light beam. Similarly to the first dichroic mirror 3, the second dichroic mirror 6 can selectively reflect or transmit incident light beams depending on their wavelengths. The second dichroic mirror 6 is for receiving the synthesized-and-converged light beam and for splitting the light beam into the first light beam and the second light beam. In more concrete terms, the second dichroic mirror 6 reflects the first light beam, while transmitting the second light beam. The second light beam having passed through the dichroic mirror 6 is focused on the image surface of the document 8.

The photosensitive drum 7 is disposed to receive the first light beam reflected from the dichroic mirror 8. It is noted that the distance between the dichroic mirror 6 and the photosensitive drum 7 is equal to the distance between the document 8 and the dichroic mirror 6. Accordingly, the first light beam is also focused on the surface of the photosensitive drum 7.

The photosensitive drum 7 is located with its rotational axis extending parallel to the main scanning direction. Accordingly, the first laser beam sweeps on the surface of the photosensitive drum 7 parallel to the rotational axis as indicated by an arrow in the figure. As the photosensitive drum 7 rotates about its rotational axis, the first laser beam can sweep the entire surface of the photosensitive drum 7.

Similarly, as the polygon mirror 4 rotates, the second laser beam sweeps on the image surface of the document 8 and scans one line image extending in the main scanning direction as indicated by an arrow in the figure. Although not shown in the drawing, a document conveying device is provided so as to convey the document 8 in an auxiliary scanning direction which is orthogonal to the main scanning direction. As the conveying device conveys the document 8, the second laser beam can sweep the entire surface of the document 8.

Variation in angles of the surfaces of the polygon mirror 4 can cause scanning to start at different positions on the surface of the photosensitive drum 7. The angular variation in the surfaces of the polygon mirror 4 can also cause scanning to start at different positions on the surface of the document 8. In order to solve these problems, the photosensor 9 is located at a predetermined position on the sweeping path of the synthesized laser beam. That is, the photosensor 9 is located capable of detecting the synthesized light beam when the light beam reaches a position some distance before an image writing/reading start position. The photosensor 9 serves to receive the synthesized beam from the fθ lens 5 and then to output a horizontal synchronization signal to the CPU 14. Receiving the horizontal synchronization signal, the CPU 14 feedback controls the first laser driving circuit 13 and the photoelectric conversion device selection unit 10 so that an image writing/reading operation is started a fixed time after the photosensor 9 outputs the horizontal synchronizing signal, to thereby prevent the variation of the image writing/reading start positions. The CPU 14 also feedback controls the rotation of the photosensitive drum 7 and the conveying operation of the document 8 based on the horizontal synchronizing signal.

The five photoelectric conversion devices 31–35 are provided for receiving the second light beam which is scattered at and reflected by the document 8. The photoelectric conversion devices 31–35 output signals indicative of the intensity of the received second light beam.

The photoelectric conversion device selection unit 10 is for serially selecting adjacent two photoelectric conversion devices from the five photoelectric conversion devices 31–35, and for supplying the adding circuit 11 with the outputs of the selected two photoelectric conversion devices. The adding circuit 11 is for adding together the supplied output signals as a second image information signal indicative of the image of the document 8. The second image information signal is stored in the memory 15.

As described above, the distance between the photosensitive drum 7 and the second dichroic mirror 6 is substantially equal to the distance between the document 8 and the second dichroic mirror 6. Accordingly, the diameter of a beam spot scanned over the surface of the photosensitive drum 7 becomes substantially equal to the diameter of a beam spot scanned over the surface of the document 8. Therefore, the optical scanning device 100 can write image information onto the photosensitive drum 7 with substantially the same resolution as that for reading image information from the document 8.

Figure 4:
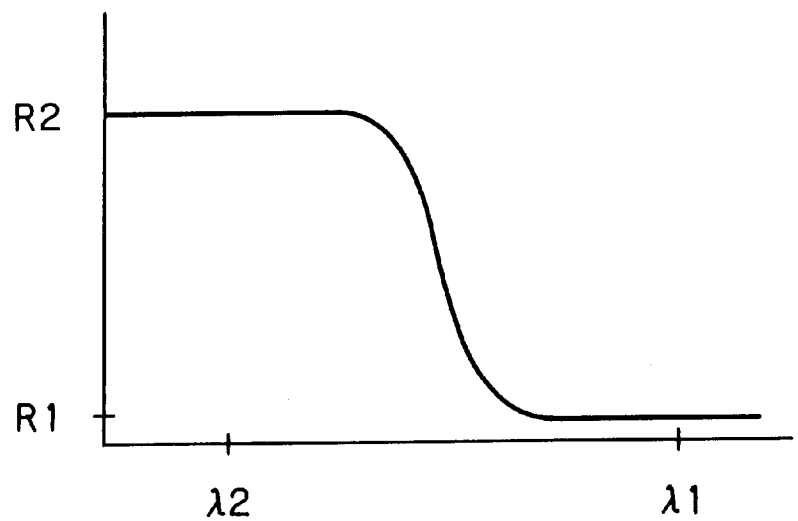
FIG. 4 is a graph showing the spectral reflection characteristic of a first dichroic mirror 3.
Figure 5:
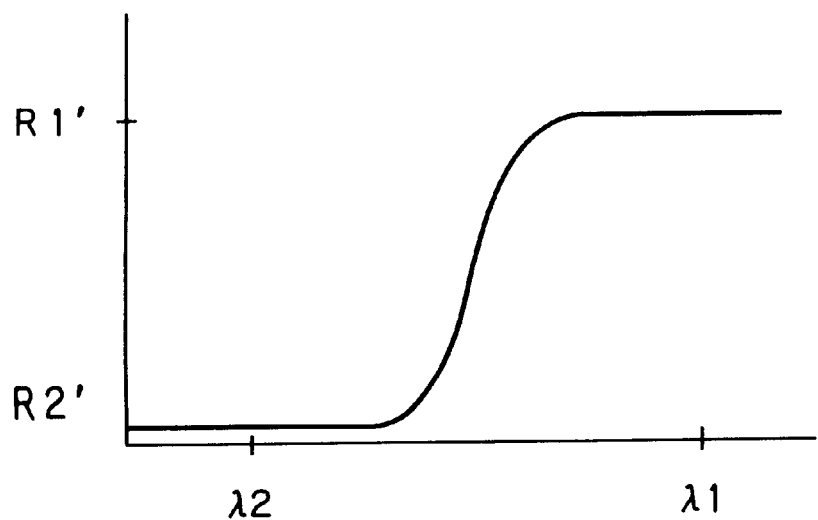
FIG. 5 is a graph showing the spectral reflection characteristic of a second dichroic mirror 6.

FIG. 4 is a graph showing a spectral characteristic of the first dichroic mirror 3. FIG. 5 is a graph showing a spectral characteristic of the second dichroic mirror 6. The horizontal axes of the graphs in FIGS. 4 and 5 represent wavelength of an incident light beam, and the vertical axes represent reflectance. As apparent from FIG. 4, the reflectance R1 of the dichroic mirror 3 at the wavelength λ1 (wavelength of the first light beam) is different from the reflectance R2 at the wavelength λ2 (wavelength of the second light beam). The reflectance R2 is several hundred to several thousand times greater than the reflectance R1. Accordingly, a transmission rate of the dichroic mirror 3 for the wavelength λ1 is considerably high and is substantially equal to that of a glass constituting a base of the dichroic mirror 3. With this spectral characteristic, the dichroic mirror 3 can properly transmit the first light beam of the wavelength λ1 while reflecting the second light beam of the wavelength λ2. Accordingly, the first light beam and the second light beam follow the common optical path P to fall incident on the polygon mirror 4.

As shown in FIG. 5, the dichroic mirror 6 has wavelength characteristic different from that of the first dichroic mirror 3. The dichroic mirror 6 can reflect the first light beam of the wavelength λ1, while transmitting the second light beam of the wavelength λ2. With this spectral characteristic, the second dichroic mirror 6 can split the light beam, which has been combined at the first dichroic mirror 3, according to the wavelength, so that only the first light beam falls incident on the photosensitive drum 7 and the second light beam falls incident on the document 8.

Next, the photoelectric conversion devices 31–35 will be described below in greater detail.

The photoelectric conversion devices 31–35 are disposed on the side of the document 8 with respect to the dichroic mirror 6. The photoelectric conversion devices 31–35 are arranged in line along the main scanning direction.

Each of the photoelectric conversion devices 31 to 35 generates a photoelectric current of an intensity proportional to the intensity of the received second light. Each photoelectric conversion device further subjects the generated photoelectric current to current-to-voltage conversion, and produces a voltage signal corresponding to the intensity of the received second light.

Figure 6:
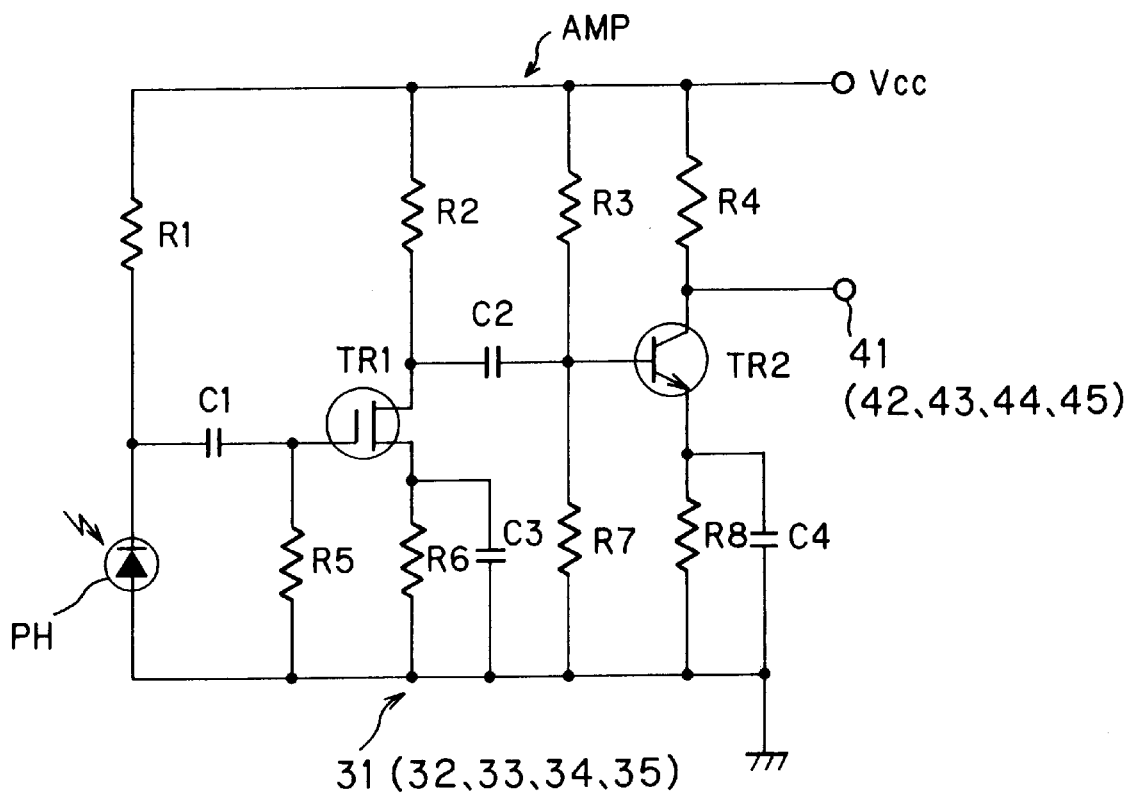
FIG. 6 is a circuit diagram of each of the photoelectric conversion devices 31–35.

The photoelectric conversion devices 31–35 have the same configuration. FIG. 6 shows a configuration of each of the photoelectric conversion devices 31–35. Each photoelectric conversion device 31–35 is constructed from a photodiode PH electrically connected with an amplifier AMP. The amplifier AMP is connected to the photodiode PH to amplify a weak photoelectric current generated at the photodiode PH. The amplifier AMP is a two-step amplifier including a FET (field effect transistor) TR1, an npn transistor TR2, resistors R1–R8, and capacitors C1 to C4. With the above-described structure, when the scattered light falls incident on the photodiode PH, a photoelectric current corresponding to the received light intensity flows through the resistance R1 and is converted into a voltage value. The voltage valve is amplified with a voltage gain of several tens by the field effect transistor TR1 and the NPN transistor TR2.

Next, the photoelectric conversion device selection unit 10 will be described below.

Figure 2:
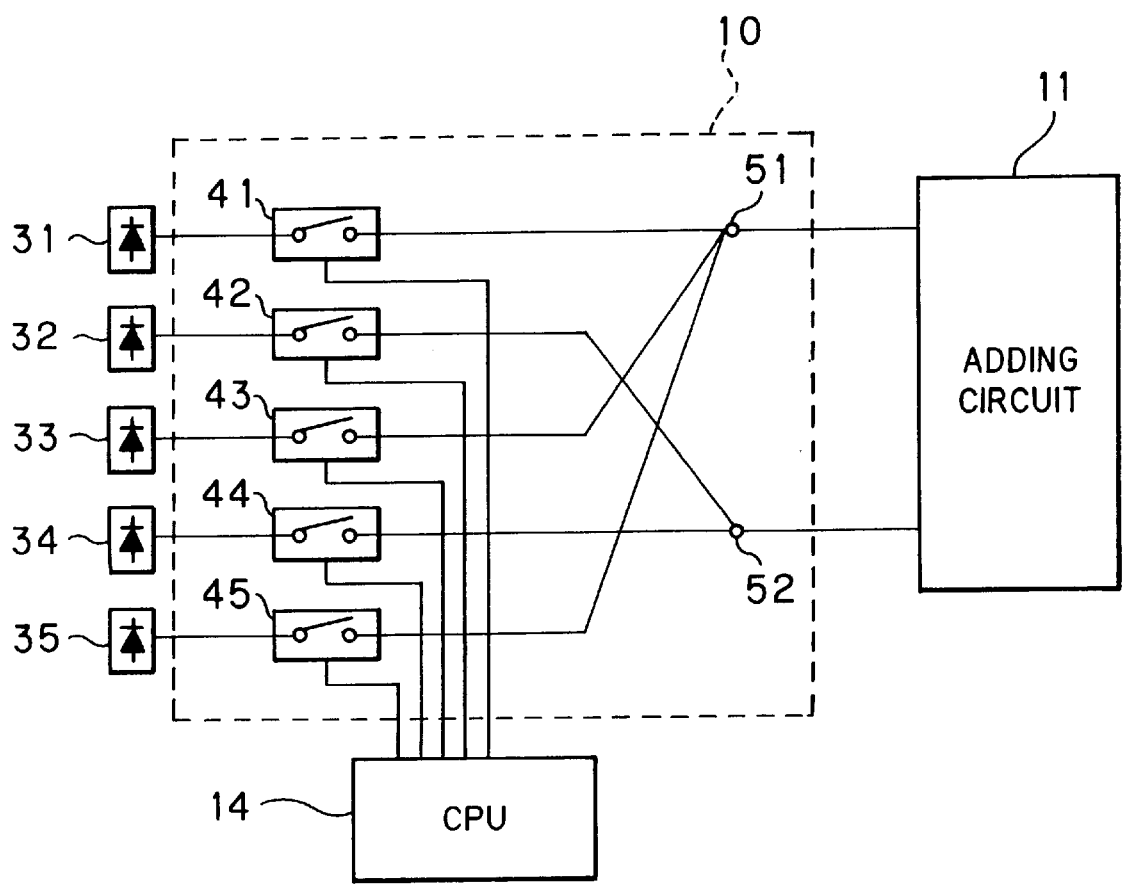
FIG. 2 is a schematic view of a photoelectric conversion device selection unit 10.

As shown in FIG. 2, the photoelectric conversion device selection unit 10 includes five analog switches 41–45, each of which is connected to a corresponding one of the five photoelectric conversion devices 31 to 35 as shown in FIG. 6. The voltage signals outputted from the photoelectric conversion devices 31 to 35 are supplied to the analog switches 41–45, respectively. The photoelectric conversion device selection unit 10 also includes two output terminals 51 and 52, which are connected to the adding circuit 11. The three analog switches 41, 43, and 45 are connected to the output terminal 51, and the remaining two analog switches 42 and 44 are connected to the output terminal 52. All of the analog switches 41 through 45 are also connected to the CPU 14 to be controlled thereby.

With the above-described structure, the photoelectric conversion device selection unit 10 is controlled by the CPU 14 to selectively supply two of the five outputs from the photoelectric conversion devices 31 to 35 to the adding circuit 11.

Figure 3A:
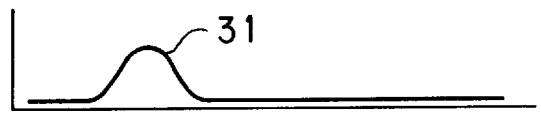
FIGS. 3(a)–3(h) show graphs of signal voltages outputted from the photoelectric conversion devices 31–35, signal voltages supplied to output terminals 51 and 52 of the photoelectric conversion device selection unit 10, and a signal voltage outputted from an adding circuit 11 when a document 8 is entirely white, in which FIG. 3(a) showing a graph of a signal voltage outputted from the photoelectric conversion device 31.
Figure 3B:
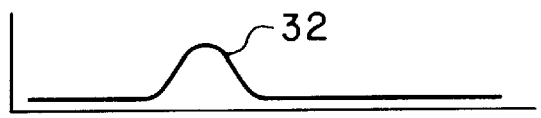
Figure 3C:
Figure 3D:
Figure 3E:
Figure 3F:
Figure 3G:
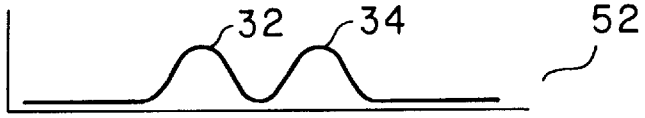
Figure 3H:

FIGS. 3(a)–3(h) are timing charts showing voltage signals generated at the photoelectric conversion devices 31 through 35, voltage signals supplied to the output terminals 51 and 52, and a voltage signal produced by and outputted from the adding circuit 11 while the second light beam scans a single line on an entirely-white color document 8 from start of scanning in the main scanning direction. That is, while the second light beam scans a single line on the white color document 8 in the main scanning direction, the photoelectric conversion devices 31 through 35 respectively produce voltage signals shown in FIGS. 3(a)–3(e), the output terminals 51 and 52 are respectively supplied with voltage signals shown in FIGS. 3(f) and 3(g), and the adding circuit 11 produces a voltage signal as shown in FIG. 3(h).

Each line image of the document 8 is scanned during a single scanning period in the main scanning direction. As shown in FIGS. 3(a)–3(h), the single scanning period is represented between a scanning start time "a" and a scanning end time "e" in the horizontal axis of the timing chart. For example, when the document is an A4 sized sheet, the time width between "a" and "e" corresponds to a time length required to scan 210 mm. The scanning start time "a" is determined a fixed time after the time "H" when the photosensor 9 issues a horizontal synchronization signal.

The CPU 14 selectively opens and closes the analog switches 41 through 45 based on time elapsed from when the photosensor 9 generates a horizontal synchronization signal. Based on the switch control, the CPU 14 serially selects two adjacent photoelectric conversion devices out of the five it photoelectric conversion devices 31 through 35. The selected two adjacent devices are connected to the output terminals 51 and 52.

The switch control will be described below in greater detail.

During the first time interval between the scanning times "a" and "b", the CPU 14 closes the switches 41 and 42. Accordingly, the output terminal 51 receives the voltage signal from the photoelectric conversion device 31 and the output terminal 52 receives the voltage signal from the photoelectric conversion device 32. During the second time interval between the scanning times "b" and "c", the CPU 14 closes the switches 43 and 42. Accordingly, the output terminal 51 receives the voltage signal from the photoelectric conversion device 33. The output terminal 52 continues receiving the voltage signal from the photoelectric conversion device 32. During the third interval between the scanning times "c" and "d", the CPU 14 closes the switches 43 and 44. Accordingly, the output terminal 51 continues receiving the signal from the photoelectric conversion device 33, and the output terminal 52 receives the voltage signal from the photoelectric conversion device 34. During the fourth interval between the scan times "d" and "e", the CPU 14 closes the switches 45 and 44. Accordingly, the output terminal 51 receives the voltage signal from the photoelectric conversion device 35 and the output terminal 52 continues receiving the voltage signal from the photoelectric conversion device 34.

Signals obtained during the same interval at the output portions 51 and 52 are added together at the adding circuit 11 into a second image information signal. In this example, during the first interval between "a" and "b", the voltage signals from the devices 31 and 32 are added together. During the second interval between "b" and "c", the voltage signals from the devices 32 and 33 are added together. During the third interval between "c" and "d", the voltage signals from the devices 33 and 34 are added together. During the fourth interval between "d" and "e", the voltage signals from the devices 34 and 35 are added together. The thus obtained second image information signal, shown in FIG. 3(h), represents the image on the document 8 without any shading errors. That is, as apparent from FIG. 3(h), a sum of the outputs from the output terminals 51 and 52, i.e., the output of the adding circuit 11, becomes satisfactorily uniform over the entire width of the white color document 8. The image information does not suffer from any nonuniformity in color density in accordance with a reading position on the document 8. It is therefore apparent that the adding circuit 11 can provide image information which accurately represents an image on the document 8. Only two voltage signals (FIGS. 3(f) and 3(g)) are added together into the second image information signal (FIG. 3(h)) during each time interval. Accordingly, the obtained second image information signal does not suffer from any noises which will possibly increase when the total number of outputs added together into the image information signal increases.

With the above-described structure, the optical scanning device 100 of the present embodiment performs the image writing operation as described below.

The CPU 14 retrieves the first image information from the memory 15 and produces a control signal for controlling the laser source 1. The control signal controls the laser source 1 to emit the first light beam with its intensity being modulated according to the first image information. The first light beam passes through the first dichroic mirror 3 and then reflected off and deflected by the polygon mirror 4. The first light beam is converged by the fθ lens 5 and falls incident on the second dichroic mirror 6. The first light beam is reflected downwardly at the second dichroic mirror 6 toward the photosensitive drum 7.

As the polygon mirror 4 rotates at the fixed speed, the first light beam is scanned across the surface of the photosensitive drum 7 in a direction parallel to the rotational axis.

The photosensor 9 detects the light beam at a position some distance before an image writing start position. The photosensor 9 outputs a horizontal synchronizing signal when receiving the light beam. Upon receiving the horizontal synchronization signal, the CPU 14 feedback-controls the first laser source 1 to emit the first light beam for writing each line's worth of image. As a result, the first light beam starts writing each line's worth of image on the photosensitive drum 7 a fixed time after a corresponding horizontal synchronizing signal. It becomes possible to prevent the variation of the image writing start position on the photosensitive drum 7. Accordingly, writing positions are arranged regularly on the photosensitive drum 7.

The optical scanning device 100 of the present embodiment performs the image reading operation as described below.

The CPU 14 controls the second laser driving circuit 12 to drive the second laser source 2 to emit the second light beam with uniform intensity. The second light beam reflects off the dichroic mirror 3 and travels toward the polygon mirror 4. Thus, the second light beam travels along the common optical path P with the first light beam. Next, the second light beam is reflected off and deflected at the polygon mirror 4 and travels toward the fθ lens 5. After being converged by the fθ lens 5, the second light beam passes through the dichroic mirror 6 before falling incident on a scanning position on the document 8.

Also during the image reading operation, the photosensor 9 serves to detect a reading start timing. The photosensor 9 detects the light beam at a position some distance before an image reading start position. The photosensor 9 outputs a horizontal synchronizing signal when receiving the light beam. Upon receiving the horizontal synchronization signal, the CPU 14 feedback-controls the photoelectric conversion device selecting unit 10 to start serially selecting two of the five photoelectric conversion devices 31–35. As a result, each line's worth of image is started to be read out from the document 8 a fixed time after the horizontal synchronizing signal. It becomes possible to prevent the variation of the image reading start position on the document 8. Accordingly, reading positions are arranged regularly on the document 8.

The second light beam scattered at and reflected by the document 8 is detected by the five photoelectric conversion devices 31 to 35. Each of the photoelectric conversion devices 31–35 produces a voltage signal corresponding to the intensity of the received light beam. The CPU 14 controls the photoelectric conversion device selection unit 10 to serially and selectively supply two outputs from the five photoelectric conversion devices 31 to 35 to the adding circuit 11. The CPU 14 performs this selection operation through control of ON and OFF of the analog switches 41 through 45 based on time measured by a horizontal synchronization signal issued from the photosensor 9.

The two outputs selected during the same intervals are supplied via the output terminals 51 and 52 to the adding circuit 11 where the two outputs are added together into a second image information signal. The second image information signal is then supplied to the CPU 14. Black and white portions on the scanning line of the document image are discriminated from each other based on the second image information signal representative of the scanned portions. The location of the scanned position is determined depending on the scanning time elapsed from the horizontal synchronization signal. Thus, one line's worth of image information is read out from the document 8 in the main scanning direction. While the reading operation in the main scanning direction is repeated, the document 8 is fed in the auxiliary scanning direction orthogonal to the main scanning direction, so that image information of the entire document 8 can be read out line by line. Furthermore, it is possible to represent several tone levels between black and white depending on the intensity of the received second light.

In the above description, the semiconductor laser 2 is oscillated to emit the second light beam of the wavelength λ2 of 670 nm which is in the visible range. Accordingly, the following advantages are obtained. When the image on the document 8 is formed by pigment or ink, sometimes although the image appears black to the human eyes, when radiated with infrared light, some of the black portions will reflect light and be detected as white. It is therefore desirable that the image of the document 8 be read using visible light. In view of this, the semiconductor laser 2 is desirably oscillated within the range of visible light, that is about 400 to 700 nm. Instead of the semiconductor laser, the laser source 2 could be a solid laser such as a YAG laser. Also, the laser source 2 could be provided with a non-linear type optical element for shortening the wavelength of the laser light. The semiconductor laser 1 can also be oscillated to emit the first light beam of the wavelength λ1 in the visible range.

Next, a modification of the present invention will be described.

According to the present modification, the laser drive circuit 13 is not controlled by the first image information stored in the memory 15, but is controlled by the second image information supplied from the adding circuit 11. That is, when receiving the second image information signal from the adding circuit 11, the CPU 14 produces a signal for controlling the laser drive circuit 13. The control signal is for controlling the laser drive circuit 13 to drive the first laser source 1 in accordance with the second image information. By modulating the laser source 1 based on the image information from the document 8, the image information read from the document 8 is written on the photosensitive drum 7. In order to attain this series of operations, the photosensitive drum 7 is rotated in synchronization with the conveying operation of the document 8 so that the image on the document 8 can be copied by a single reading operation.

Thus, according to the present modification, the light source 2 emits the second light beam with a uniform intensity. The first laser source 1 emits the first light beam with its intensity being modulated according to the second image information supplied from the adding circuit 11. The first and second light beams are synthesized so as to travel along the common optical path P. The synthesized light beams are deflected by the polygonal rotating mirror 4 and converged by the lens 5. The converged light beams fall on the beam splitting mirror 6 to be separated into the first and second light beams. The second light beam scans the image surface of the document 8. Light scattered at and reflected by the image surface of the document 8 is detected by the five photoelectric conversion devices 31–35. Two of the outputs from the photoelectric conversion device 31–35 are inputted at a time to the adding circuit 11 where the inputted signals are added together. The output from the adding circuit 11 is inputted to the CPU 14 as the second image information indicative of the document 8. The first light beam, which bears the second image information on the document 8, is projected on the image forming surface of the photosensitive drum 7 for writing the document image.

While the invention has been described in detail with reference to the specific embodiment thereof, it would be apparent to those skilled in the art that various changes and modifications may be made therein without departing from the spirit of the invention, the scope of which is defined by the attached claims.

For example, in the above description, each of the photoelectric conversion devices 31 to 35 is constructed from the assembly of the photodiode and the amplifier circuit for amplifying a signal outputted from the photodiode. However, each of the photoelectric conversion devices 31 to 35 may be formed from a semiconductor element chip including a photodiode integrated with an amplifier circuit in a single package.

A dichroic mirror having the spectral characteristic shown in FIG. 4 can be used also as the second dichroic mirror 6. In this case, however, the positions of the photosensitive drum 7 and of the document 8 should be switched.

In the above description, the five photoelectric conversion devices 31–35 are employed. However, at least three photoelectric conversion devices may be employed. Much more than five photoelectric conversion devices can be employed. In the above description, two of the five photoelectric conversion devices 31–35 are selected at a time to be connected to the adding circuit 11. However, at least two photoelectric conversion devices may be selected at a time.

What is claimed is:

1. An optical scanning device comprising:
    a plurality of light sources which emit a plurality of light beams of different wavelengths;
    an optical path combining unit which guides the plurality of light beams emitted from the plurality of light source through a single optical path, thereby combining the light beams along a single light beam;
    a light deflecting unit which deflects the single light beam produced by the optical path combing unit;
    a light converging unit which converges the single light beam deflected by the light deflecting unit;
    an optical path separating unit which receives the single light beam having passed through the light converging unit and which separates the single light beam into the plurality of light beams so that one of the light beams falls incident on an image forming surface of a photosensitive body and so that another one of the light beams falls incident on a surface of a document to be read;

a horizontal synchronization signal detection unit which receives the single light beam deflected by the light deflection unit and outputs a horizontal synchronization signal;

a light detection unit which detects light scattered by the surface of the document, the light detection unit including at least three photoelectric conversion elements;

a photoelectric conversion element selection unit which serially selects at least two photoelectric conversion elements out of the at least three photoelectric conversion elements; and an adding unit which adds outputs from the selected photoelectric conversion elements, thereby producing image information of the document.

2. An optical scanning device as claimed in claim 1, wherein the light deflecting unit deflects the single light beam, thereby scanning the one light beam on the photosensitive body in a main scanning direction and scanning the other light beam on the document in the main scanning direction.

3. An optical scanning device as claimed in claim 2, wherein the at least three photoelectric conversion elements are arranged in line along the main scanning direction.

4. An optical scanning device as claimed in claim 3, wherein the photoelectric conversion element selection unit serially selects at least two photoelectric conversion elements which are arranged adjacent to one another.

5. An optical scanning device as claimed in claim 4, wherein the photoelectric conversion element selection unit serially switches to select the at least two photoelectric conversion elements, the switching timing being determined based on the horizontal synchronization signal.

6. An optical scanning device as claimed in claim 5, wherein the photoelectric conversion element selection unit switches to serially select two adjacent photoelectric conversion elements.

7. An optical scanning device as claimed in claim 6, further comprising a modulation unit which controls one of the light sources to modulate the intensity of the light beam to fall incident on the image forming surface of the photosensitive body, based on image information desired to be formed on the photosensitive body.

8. An optical scanning device as claimed in claim 7, wherein the modulation unit modulates the intensity of the light beam at a timing which is determined dependent on the horizontal synchronization signal.

9. An optical scanning device as claimed in claim 8, wherein the modulation unit includes an information reception unit which receives the document image information from the adding unit, the modulation unit modulating the intensity of the light beam based on the received document image information.

10. An optical scanning device as claimed in claim 9, further comprising a control unit which conveys the photosensitive body and the document in synchronization with the horizontal synchronization signal.

11. An optical scanning device as claimed in claim 1, wherein at least one of the plurality of light sources emits a light beam having a wavelength which falls within a visible light range between about 400 to 700 nanometers.

12. A optical scanning device as claimed in claim 1, wherein each of the optical path combining unit and the optical path separating unit includes a dichroic mirror for reflecting and transmitting incident light beams according to their wavelengths.

13. An optical scanning device comprising:

a plurality of light sources which emit a plurality of light beams of different wavelengths;

an optical path combining unit which guides the plurality of light beams emitted from the plurality of light source along a single optical path, thereby combining the light beams into a single light beam;

a light deflecting unit which deflects the single light beam produced by the optical path combining unit;

a light converging unit which converges the single light beam deflected by the light deflecting unit;

an optical path separating unit which receives the single light beam having passed through the light converging unit and separates the single light beam into the plurality of light beams so that one of the light beams falls incident on an image forming surface of a photosensitive body and so that another one of the light beams falls incident on a surface of a document to be read;

a light detecting unit which detects light scattered by the surface of the document, the light detection unit including at least three photoelectric conversion elements;

a photoelectric conversion element selection unit which serially selects at least two photoelectric conversion elements out of the at least three photoelectric conversion elements; and an adding unit which adds outputs from the selected photoelectric conversion elements, thereby producing image information of the document.

14. An optical scanning device as claimed in claim 13, wherein the light deflecting unit deflects the single light beam, thereby scanning the one light beam on the photosensitive body in a main scanning direction and scanning the other light beam on the document in the main scanning direction, further comprising a horizontal synchronization signal detection unit which receives the single light beam deflected by the light deflection unit and outputs a horizontal synchronization signal.

15. An optical scanning device as claimed in claim 14, wherein the at least three photoelectric conversion elements are arranged in line along the main scanning direction.

16. An optical scanning device as claimed in claim 15, wherein the photoelectric conversion element selection unit serially selects at least two photoelectric conversion elements which are arranged adjacent to one another.

17. An optical scanning device as claimed in claim 16, wherein the photoelectric conversion element selection unit serially switches to select the at least two photoelectric conversion elements, the switching timing being determined dependent on the horizontal synchronization signal.

18. An optical scanning device as claimed in claim 16, wherein the photoelectric conversion element selection unit switches to serially select two adjacent photoelectric conversion elements.

\* \* \* \* \*